Figure 1:
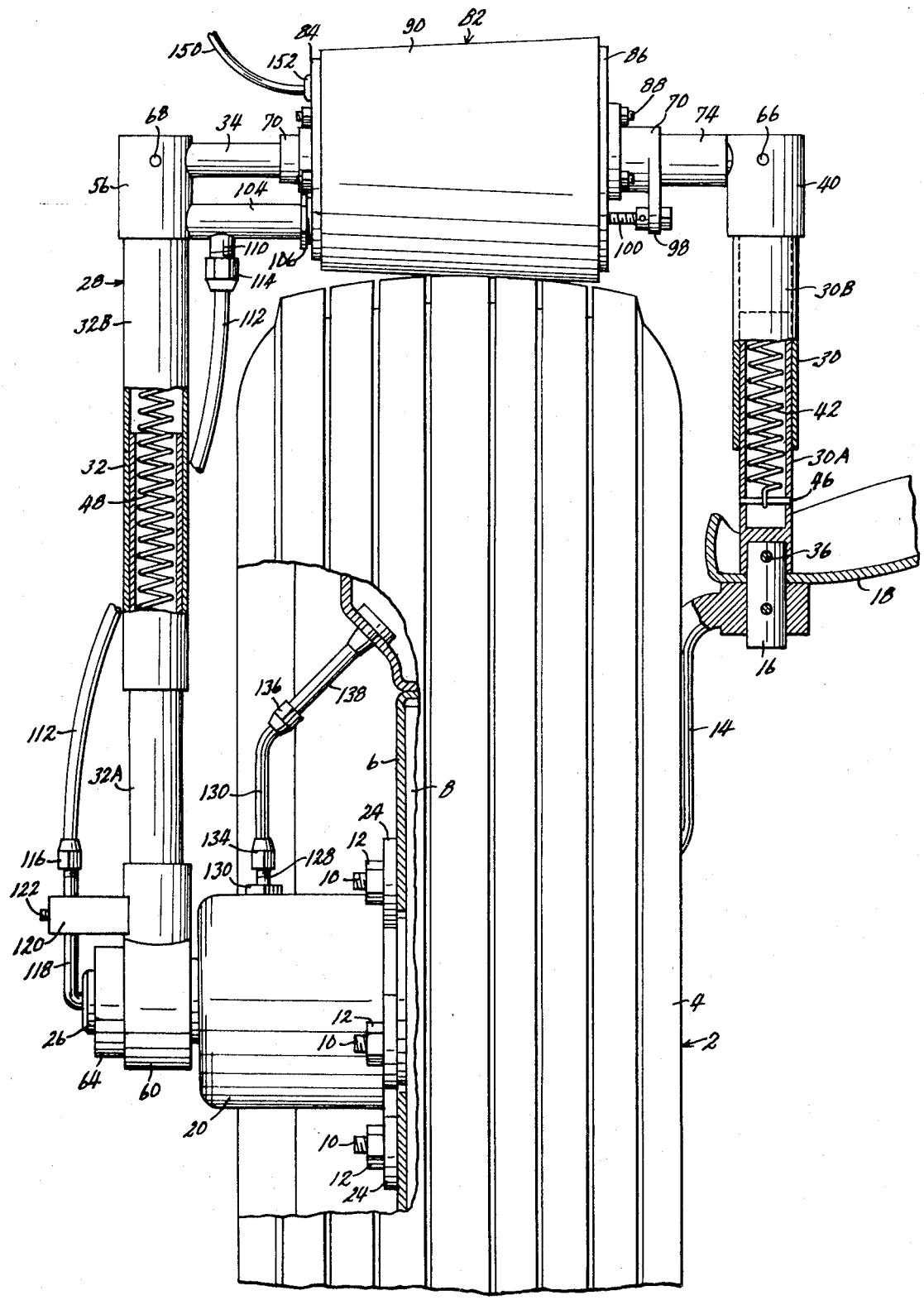

United States Patent [19]
Finley

[11] 3,741,473
[45] June 26, 1973

[54] ODOMETER

[76] Inventor: Carl E. Finley, 401 E. Fourth Street, Lamar, Mo. 64759

[22] Filed: Dec. 8, 1971

[21] Appl. No.: 205,968

[52] U.S. Cl. ............................................. 235/95 R
[51] Int. Cl. ............................................. G01c 22/00
[58] Field of Search .......................... 235/95 R, 96; 33/141 R, 141 D, 142

[56] References Cited
UNITED STATES PATENTS

| | | | |
|---|---|---|---|
| 2,665,897 | 1/1954 | Mollenhour | 235/95 R |
| 3,202,353 | 8/1965 | Nowak et al. | 235/95 R |
| 3,357,636 | 12/1967 | Ferro, Sr. | 235/95 R |
| 3,458,128 | 7/1969 | Tillman | 235/95 R |
| 3,643,860 | 2/1972 | Murphy, Jr. et al. | 235/95 R |

*Primary Examiner*—Stephen J. Tomsky
*Attorney*—John A. Hamilton

[57] ABSTRACT

An odometer consisting of a frame attachable to a steerable, unpowered automobile wheel so as to be movable but not rotatable therewith, a roller carried by the frame on an axis parallel to the wheel axis and urged resiliently against the periphery of the tire of the wheel so as to be rotated when the wheel turns, and mechanism operable to count and indicate revolutions of the roller. The roller may be conical coaxially with its axis, and mechanism may be provided for moving the roller parallel to its axis, responsively to changes of air pressure in the tire, whereby to compensate for differences of tire diameter, and hence the distance travelled for each rotation thereof, resulting from different tire pressures.

9 Claims, 5 Drawing Figures

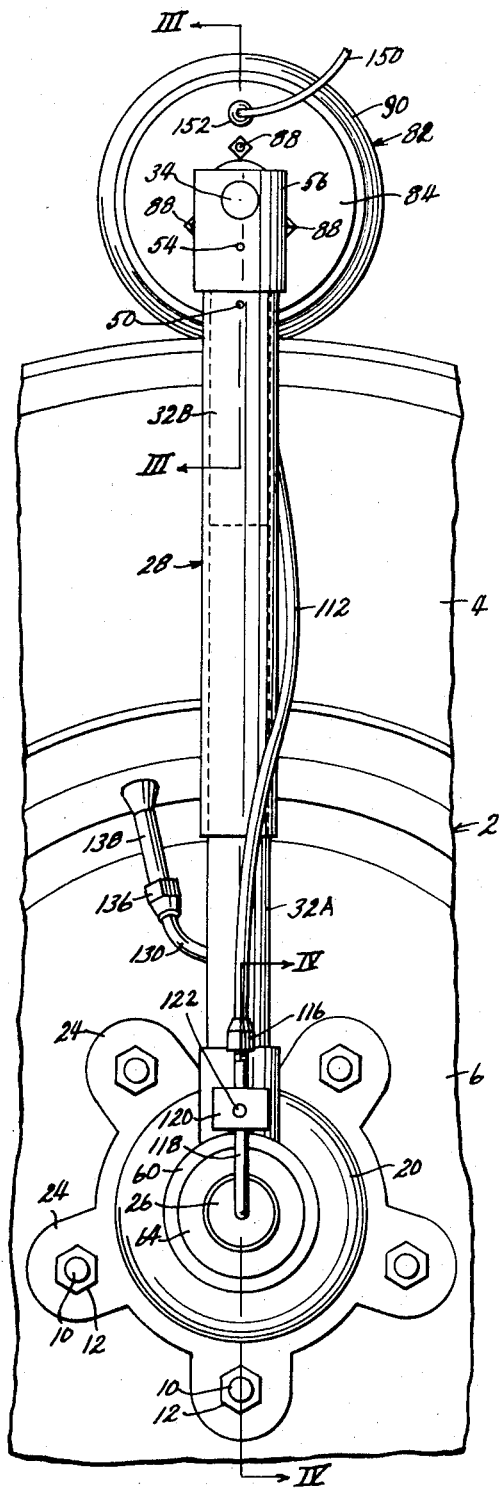
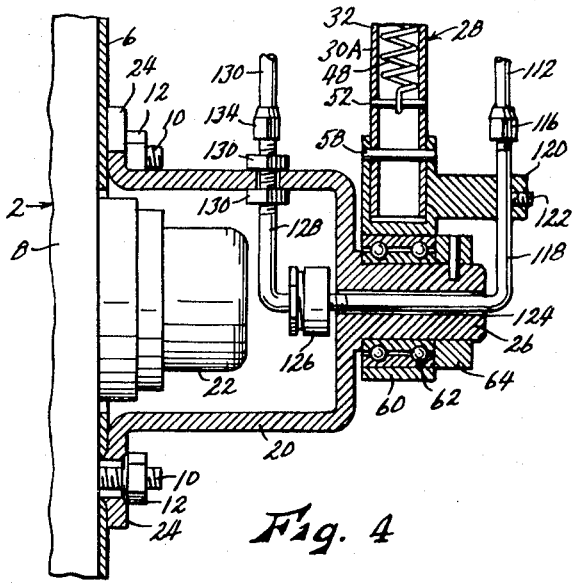
Fig. 2
Fig. 4
Fig. 5

ODOMETER

This invention relates to new and useful improvements in odometers, or instruments for measuring distance travelled, by automobiles, trucks, and other vehicles.

The primary object of the present invention is the provision of an odometer capable of measuring the distance travelled with greater accuracy than has heretofore been possible. The odometers with which automotive vehicles are customarily furnished may be sufficiently accurate for general purposes, but often a greater accuracy is desirable. For example, a telephone line construction contractor may desire to use a vehicle odometer for laying out and properly spacing the positions at which to set telephone poles in the ground. For this purpose, the individual readings to be taken range normally from 100 to 500 feet, and the accuracy should be within ± ½ percent. The usual odometer is virtually useless in this application. It indicates tenths of miles as the smallest increment, and while smaller increments can be estimated, they cannot be estimated with the required accuracy. Even if they could be read directly in feet, it would still be subject to several causes of inaccuracy. First, it usually operates by a geared drive from the vehicle transmission, and so in effect merely counts revolutions of the driven wheels of the vehicle. The driven vehicle wheels have a sometimes substantial degree of slippage relative to the road surface, particularly during periods of acceleration of deceleration, or on dirt, gravel or other loose surfaced roads, and this slippage introduces error into the odometer reading. Second, it does not compensate for tire wear. Tire wear gradually reduces the tire diameter and circumference, and hence the road distance travelled for each revolution thereof, so that any odometer which merely counts wheel revolutions will give gradually more and more excessive readings. Third, it does not compensate for variations in the air pressure of the tire. All tires compress or yield to some degree where they engage the road, and the effective tire diameter, and distance travelled per revolution thereof thus varies with the air pressure, higher pressures increasing the effective tire diameter and distance travelled per revolution, and vice versa.

Accordingly, the present odometer includes means operable to eliminate or greatly reduce all of the above enumerated sources of inaccuracy. Absolute accuracy in measuring the travel of a vehicle supported by yieldable pneumatic tires is not possible so far as is now known, but the present device will provide accuracy well within the acceptable limits of ± ½ percent over any distance, and in most cases even greater accuracy.

Other objects are simplicity and economy of construction, and efficiency and dependability of operation.

Figure 3:
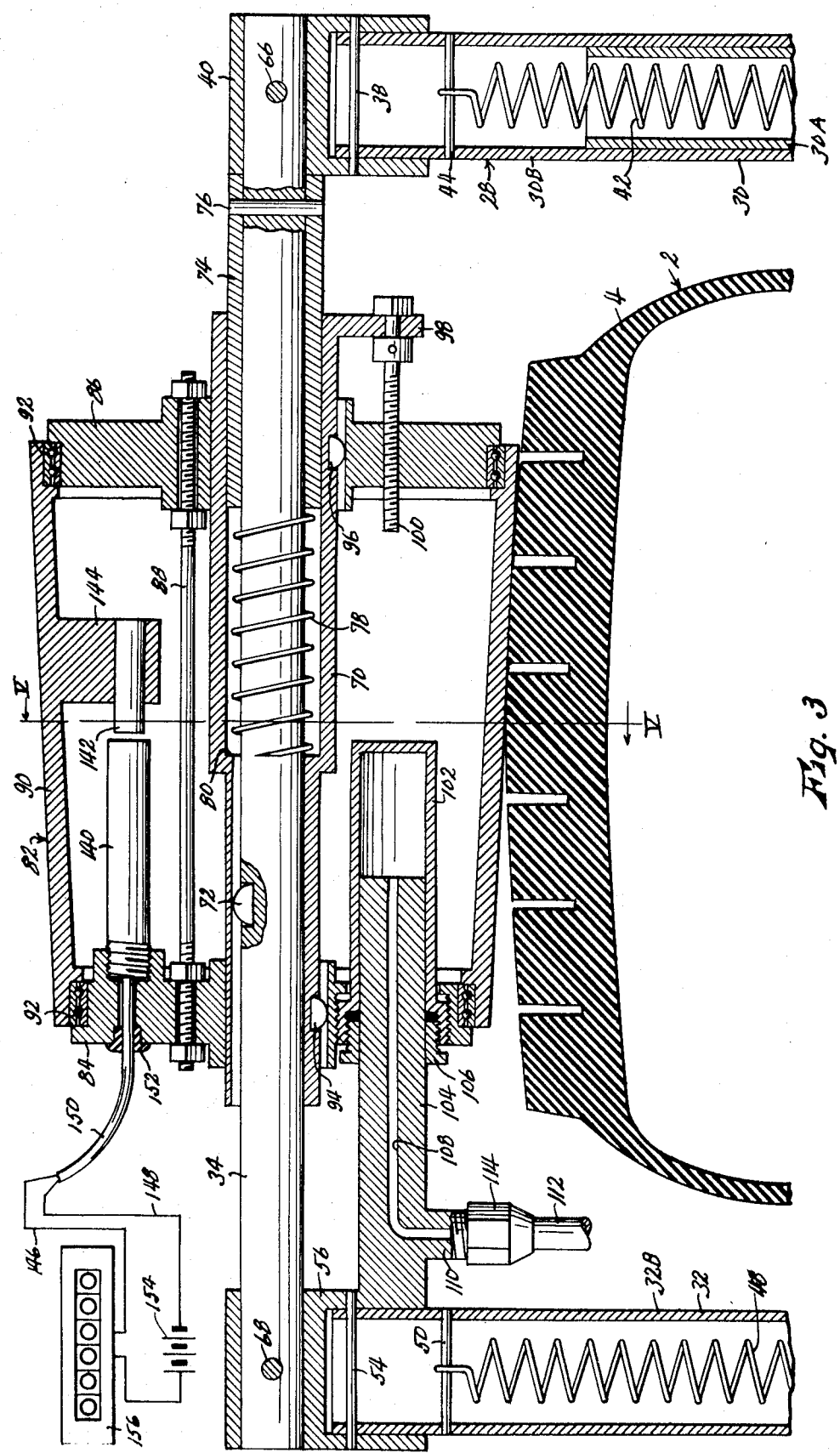

With these objects in view as well as other objects which will appear in the course of the specification, reference will be had to the accompanying drawing, wherein:

FIG. 1 is a fragmentary edge elevational view of a vehicle wheel showing an odometer embodying the present invention mounted operatively thereon, with parts broken away, FIG. 2 is a fragmentary side elevational view of the parts shown in FIG. 1, FIG. 3 is an enlarged, fragmentary sectional view taken on line III—III of FIG. 2, and including a schematic wiring diagram, FIG. 4 is an enlarged, fragmentary sectional view taken on line IV—IV of FIG. 2, and FIG. 5 is a sectional view of the roller taken on line V—V of FIG. 3.

Like reference numerals apply to similar parts throughout the several views, and the numeral 2 applies generally to a vehicle wheel having a pneumatically inflated tire 4, and including a rigid wheel disc 6 removably secured to the brake drum 8 by threaded lugs 10 and lug nuts 12, all as common and well known in the art. Wheel 2 may be assumed to be a front wheel, since it is desirable that the odometer be mounted on a non-powered wheel, and since in most vehicles it is the front wheels which are not powered. If the vehicle has a front-wheel drive, the odometer would be mounted on a rear wheel. The front wheels are also generally the steerable wheels, and for this reason wheel 2 is shown mounted rigidly on a steering arm 14 affixed to a steering pin 16 disposed at right angles to the wheel axis and carried for axial oscillation by a portion of the wheel suspension frame 18. Thus when pin 16 is turned by the steering mechanism (not shown), wheel 2 turns to steer the vehicle.

The odometer as contemplated by the present invention includes a cup-shaped hub member 20 fitted coaxially over the grease cap 22 (see FIG. 4) of the wheel hub, and having integral ears 24 at its inner end which are engaged on lugs 10 and secured by lug nuts 12. Formed integrally with the hub is an outwardly extending stub shaft 26, also coaxial with wheel 2. The odometer also includes a frame indicated generally by the numeral 28 and being generally of inverted U-shape, including a pair of parallel, vertical legs 30 and 32 disposed respectively adjacent the inner and outer faces of wheel 2, in spaced relation therefrom, and a shaft 34 extending between the upper ends of said legs, above tire 4 of the wheel and parallel to the wheel axis, said shaft being rigidly affixed at its ends to said legs. Leg 30 is telescopically extensible in length, including a lower section 30A affixed at its lower end, as by pin 36, to steering pin 16, so as to turn therewith, and an upper section 30B telescoped slidably over said lower section and secured at its upper end, as by pin 38, to a head fixture 40. A helical tension spring 42 is disposed within said leg, being attached at its upper and lower ends to pins 44 and 46 affixed respectively in leg sections 30B and 30A, whereby said leg is resiliently biased toward a shorter length. Leg sections 30A and 30B are sufficiently non-circular in cross-sectional contour to prevent relative rotation therebetween.

Similarly, outer leg 32 consists of slidably telescoped lower and upper sections 32A and 32B having therein a tension spring 48 attached at its upper end to a pin 50 affixed in leg section 32B and at its lower end to a pin 52 fixed in leg section 32A. Leg 32 is affixed at its upper end, as by pin 54, in a head fixture 56, and at its lower end, as by pin 58, in a bearing fixture 60 which is rotatably mounted on stub shaft 26 of hub member 20 by a ball bearing 62 and secured thereon by a collar 64 pinned to said shaft. It will be appreciated, however, that frame 28 does not rotate with wheel 2, said frame being affixed by its leg 30 to steering pin 16, and that stub shaft 26, which does rotate with the wheel, rotates within bearing fixture 60. Shaft 34 extends between head fixtures 40 and 56, and is affixed therein by pins 66 and 68 respectively.

Mounted on shaft 34 is a carrier sleeve 70. Said sleeve is keyed to said shaft, as by key 72, so as to be slidable along said shaft, but not rotatable therein. The end portion of said sleeve closer to frame leg 30 is enlarged in diameter, and telescopically engaged over a stop sleeve 74 which is fixedly pinned to shaft 34 at 76. A helical compression spring 78 is positioned about shaft 34, bearing at one end against sleeve 74, and at its opposite end against an internal shoulder 80 of sleeve 70, whereby to urge sleeve 70 outwardly along shaft 34, or to the left as viewed in FIG. 3.

Mounted on carrier sleeve 70 is a roller assembly indicated generally by the numeral 82. Said assembly includes a pair of end walls 84 and 86 disposed concentrically with shaft 34 and rigidly interconnected by tie rods 88 extending parallel to the shaft, and a hollow roller shell 90 coaxial with the shaft and rotatably mounted at its respective ends on end walls 84 and 86, by means of ball bearings 92. Said end walls are connected to carrier sleeve 70 by keys 94 and 96 respectively, so as to be slidable along said sleeve, but not rotatable thereon. Roller shell 90 is preferably externally conical in form, with its smaller end to the left as viewed in FIG. 3, for a reason which will presently appear.

Carrier sleeve 70 is extended outwardly from end wall 86 of the roller assembly, and is provided at its extended end with an integrally, radially extending ear 98 in which is rotatably mounted a screw 100. Said screw is parallel to shaft 34, and is threaded into end wall 86. Thus, by turning said screw, roller assembly 82 may be shifted axially along the carrier sleeve in either direction. Mounted in end wall 84 of the roller assembly is an air cylinder member 102, which is disposed internally of the roller assembly, but opens outwardly through end wall 84, it axis being parallel to but downwardly offset from shaft 34. Operable in said cylinder is a fixed piston 104 formed integrally with head fixture 56 of frame leg 32, a packing device 106 forming an air-tight seal therebetween. An air passageway 108 of said piston opens into cylinder 102, and communicates with a lateral neck 110 of said piston adjacent frame leg 32. One end of a flexible tube 112 is connected by fitting 114 to neck 110, and the opposite end of said tube is connected by fitting 116 to a rigid tube 118 fixed in an integral ear 120 of bearing fixture 60 by set screw 122. Tube 118 is angled to extend through a bore 124 formed axially in stub shaft 26, in order that said shaft may revolve while said tube remains stationary, and into the interior of hub member 20. Within said hub member, tube 118 is connected by an air-tight rotary swivel coupling 126 (see FIG. 4), which is coaxial with wheel 2, to a rigid tube 128 which is fixed in a wall of said hub member by nuts 130, extending exteriorly of said hub. A flexible tube 132 is connected to the outer end of tube 128 by fitting 134, and its opposite end is connected by fitting 136 with the usual valve stem 138 of tire 4. It will be understood that fitting 136 is provided with an internal projection or the like operable to open the usual valve of stem 138 as said fitting is attached to said stem. Thus the interior of tire 4 is connected at all times to the interior of air cylinder 102, and the cylinder pressure will always equal the tire pressure. Pressure in cylinder 102 urges roller assembly 82 to the right as viewed in FIG. 3, against the bias of spring 78, until the total air pressure force is balanced by the spring pressure.

Affixed in end wall 84 of the roller assembly, interiorly of roller shell 90, is an electric proximity switch 140, which is not detailed but is standard and well known in the art, consisting broadly of an electric switch operable to be actuated each time a magnet is brought into close proximity therewith. In this case, the magnet, indicated at 142, is permanently mounted in a boss 144 formed on the interior surface of roller shell 90, so as to be moved past switch 140, in close proximity, once during each revolution of said shell. The lead wires 146 and 148 of switch 140 are contained in a cable 150 extending outwardly from end wall 84 through a seal 152, and as diagrammed in FIG. 3, are connected in series with a power source 154, which may be the usual vehicle battery, and an electrically actuated counter device 156 which is operable to advance one digit each time switch 140 is actuated. Preferably, each digit advance of the counter should accurately indicate a small but convenient unit of vehicle travel, such as one foot. It will be understood that counter 156 is preferably mounted in the vehicle at a position for convenient viewing by the driver.

In operation, it will be seen that with the device mounted as shown, springs 42 and 48 of frame legs 30 and 32 urge and maintain roller shell 90 firmly against the tread of tire 4 to insure a firm, non-slip engagement therebetween, so that as the vehicle travels, said roller turns, its revolutions being counted and recorded by counter 156 to indicate the distance of vehicle travel, and that the indicated distance will be accurate so long as the effective circumference and diameter of roller 90 bears the proper ratio to the effective circumference and diameter of the tire.

If counter 156 is to indicate travel in feet, it is convenient to use a roller having an effective circumference of 1 foot, since the surface travel of the roller is equal to the surface travel of the tire tread, and since the surface travel of the tire tread is generally equal to the distance of vehicle travel. Any reduction of the effective tread circumference, resulting from tread wear, is automatically reflected in the reading of counter 156, since the reduction of tread circumference results both in a reduction of the vehicle travel per revolution of the wheel 2, and also in a reduction of the number of turns of roller 90 per revolution of wheel 2.

However, the surface travel of roller 90 will seldom if ever be precisely equal to the distance of vehicle travel under ordinary circumstances. In the first place, all pneumatically inflated tires are flattened or deformed at least to some degree in the areas thereof engaging the road surface at any given moment, so that the vehicle is actually travelling on wheels of smaller effective radius, and hence travelling a lesser distance per wheel revolution, than would be the case if the effective radius of the wheel were that actually engaging roller 90, which does not depress or deform the tire to any comparable degree. Moreover, the degree of yielding of the tire against the road surface is different with different tires, even with equal air pressures, due to differences of tire construction. Also, the degree of tire yield varies in any tire with the air pressure of the tire, lower pressure permitting still more tire yield, and hence a further reduction in the distance travelled per revolution of the wheel. Hence, for a high degree of accuracy, it will be apparent that some means should be provided for adjusting the ratio of the rotary speed of roller 90 to that of wheel 2. In the present odometer, this adjustment is made manually by turning screw 100, and automatically in response to changes of tire pressure by means of cylinder 102 and spring 78. Either of these means is operable to move roller 90 axially along shaft 34, either to the right as shown in FIG. 3, whereby to bring a portion of roller 90 of lesser diameter into engagement with tire 4 to produce more turns of the roller per revolution of wheel 2, or to the left whereby to bring a portion of the roller of greater diameter into engagement with the tire to produce fewer roller turns per wheel revolution.

The odometer, mounted as shown, is preferably first calibrated to a given vehicle wheel by driving the vehicle as shown over an accurately measured course, say 1,000 feet, observing any error in the reading of counter 156, and correcting said error by turning screw 100 manually. A scale may conveniently be worked out for indicating what change of counterreading will be produced over a 1,000 foot course, for each turn or fraction of a turn of screw 100. This calibration is carried out with tire 4 inflated to a pressure midway in a range or ordinary and acceptable pressures, said at 25 psi as the midpoint of a 20–30 psi range. Tests have shown that with only this manual adjustment, with the roller otherwise fixed against movement along shaft 34, readings within a range of ± ½ percent accuracy can reliably be obtained from counter 156, as long as the tire pressure is maintained within the 20–30 psi range.

Still greater accuracy is obtained, compensating for any change of tire pressure within or even outside of the range given above, by the interaction of cylinder 102 and spring 78. If the tire pressure drops, reducing the distance of vehicle travel per revolution of the wheel, the pressure in cylinder 102 drops, allowing roller 90 to be moved to the left by spring 78, bringing a larger portion of the roller into play against the tire, and producing correspondingly fewer turns of the roller per revolution of the wheel. Conversely, if the tire pressure increases, as on hot road surfaces, the increased pressure in cylinder 102 forces the roller to the right against spring 78, bringing a smaller portion of the roller into play against the tire. This produces more revolutions of the roller per revolution of the wheel, to compensate for the resulting greater distance of vehicle travel per wheel revolution.

The accuracy of this automatic pressure-responsive system depends on the proper correlation of the degree of taper of the roller to the modulus of spring 78 and area of cylinder 102, within the expected range of pressure variation. These relationships can be developed mathematically, though ultimate accuracy will be affected by unavoidable production variations. Also, some inaccuracy of ultimate readings will result from various imponderable factors, such as irregular tire wear, and wheel "bouncing" or vibration, which can cause minute "rippling" of the tire and slippage of the roller thereagainst. Nevertheless, tests have shown that the pressure-responsive adjusting means can reliably reduce by one-half any error in the counter reading which remains after manual calibration has been performed, thereby producing an accuracy in the range of ± ¼ percent, which is amply close for most purposes.

Of course, if roller 90 has a one-foot circumference, and if it is equipped with only one proximity switch 140 and magnet 142, as shown, then the least increment of vehicle travel readable on counter 156 is one foot, not fractions thereof. This factor in itself can introduce an error of almost a foot into the reading. While this degree of error would ordinarily be acceptable, greater accuracy can be obtained either by reducing the circumference of roller 90 to some smaller fraction of a foot, or, in a roller of the same diameter, placing either more switches or more magnets within the roller, angularly distributed about shaft 34. Proximity switches 140 are available which can be reliably actuated at least 50 times per second. With the one-foot roller as shown, this permits accurate recording at vehicle speeds in excess of 30 miles per hour, which corresponds to 44 feet per second. Actually, however, the vehicle speeds recommended for use with devices of this type are usually in the area of only 15 miles per hour, in order to reduce error caused by bouncing of the wheel on the road surface, or rippling of the tire tread.

Accuracy of the present odometer is improved by the fact that it is mountable on a non-powered vehicle wheel, which is much less likely to slip or slide on the road surface than a powered wheel. Frame 28 is in effect mounted directly on the axle of the wheel, or members affixed to and movable with said axle, so that roller 90 accurately follows any movement of the wheel vertically in its own plane and does not leave, or slip or slide relative to the tire tread. Frame springs 42 and 48 further insure non-slip engagement of the roller with the tire. When the wheel 2 is a steering wheel pivotable about a generally vertical steering axis, the attachment of frame 28 to a portion of the wheel suspension movable about said steering axis, as shown, insures preservation of parallelism between the wheel and roller axes.

While I have shown and described a specific embodiment of my invention, it will be readily apparent that many minor changes of structure and operation could be made without departing from the spirit of the invention.

What I claim as new and desire to protect by Letters Patent is:

1. An odometer for use in connection with an automotive vehicle having a ground-engaging wheel equipped with a pneumatically inflated tire, said vehicle wheel being a non-powered, steerable wheel, the suspension thereof including parts pivotal about a generally vertical axis relative to the vehicle to accomplish steering thereof, said odometer comprising:
    a. a frame,
    b. means mounting said frame on said pivotal wheel suspension means adjacent said wheel, whereby said frame turns with said wheel on its vertical steering axis, and is movable with the axis of said wheel transversely thereto, but is not rotatable with said wheel,
    c. a roller carried rotatably by said frame so that its periphery has a non-slip engagement with the tread periphery of said tire, its axis being parallel with the axis of said wheel, whereby said roller is rotated by rotation of said vehicle wheel, and
    d. means operable to count and record the revolutions of said roller.

2. An odometer for use in connection with an automotive vehicle having a ground-engaging wheel equipped with a pheumatically inflated tire, said odometer comprising:
    a. a frame, b. means mounting said frame on a portion of said vehicle adjacent said wheel so as to be movable with the axis of said wheel transversely thereto, but not rotatable with said wheel,
c. a roller carried rotatably by said frame so that its periphery has a non-slip engagement with the tread periphery of said tire, its axis being parallel with the axis of said wheel, whereby said roller is rotated by rotation of said vehicle wheel,
d. means operable to count and record the revolutions of said roller, and means operable to adjust the ratio of the rotative speed of said roller to the rotative speed of said wheel.

3. An odometer is recited in claim 2 wherein said adjusting means is manually operable.

4. An odometer as recited in claim 2 wherein said adjusting means is automatically responsive to changes of the air inflation pressure of said tire, whereby said ratio of roller and tire speeds is varied in generally inverse relation to changes in said air pressure.

5. An odometer as recited in claim 2 wherein said adjusting means comprises:
a. manually operable means for changing the effective diameter of said roller in engagement with said tire, and
b. pressure-sensitive means operable responsively to changes of air pressure in said tire to change the effective diameter of said roller in engagement with said tire.

6. An odometer as recited in claim 2 wherein said roller is externally frustro-conical in form, coaxially with its axis of rotation, and wherein said adjusting means comprises means operable to move said roller parallel to its axis, selectively in either direction, relative to said frame, whereby to bring portions thereof of different diameters into engagement with said tire.

7. An odometer as recited in claim 6 wherein said means for moving said roller parallel to its axis is manually operable.

8. An odometer as recited in claim 6 wherein said means for moving said roller parallel to its axis includes pressure-sensitive means interconnected with and responsive to air pressure within said tire.

9. An odometer for use in connection with an automotive vehicle having a ground-engaging wheel equipped with a pneumatically inflated tire, said odometer comprising:
a frame including a fixed shaft parallel with the wheel axis and spaced outwardly from the tread of said tire,
b. means mounting said frame on a portion of said vehicle adjacent said wheel so as to be movable with the axis of said wheel transversely thereto, but not rotatable with said wheel,
c. a carrier sleeve mounted on said shaft for movement axially along said shaft but secured against rotation thereon,
d. roller end discs carried on said sleeve for movement axially therealong but secured against rotation thereon
e. a roller carried by said end discs for rotation coaxially with said shaft, said roller being externally conical in form to have larger and smaller ends, and having a non-slip engagement with the tread periphery of said tire, whereby said roller is rotated by rotation of said vehicle wheel,
f. manually operable means for moving said roller end discs axially along said carrier sleeve,
g. resilient means urging said carrier sleeve axially along said shaft toward the smaller end of said roller,
h. a pneumatic cylinder carried by the roller end disc at the smaller end of said roller, parallel with said shaft, and opening outwardly,
i. a piston carried fixedly by said frame and projecting operably into said cylinder,
j. means interconnecting said cylinder to the interior of said tire, whereby the air pressure of said tire enters said cylinder and forces said carrier sleeve and roller end discs axially along said shaft toward the larger end of said roller, against the bias of said resilient means, and
k. means operable to count and record the revolutions of said roller.

* * * * *